United States Patent
Pell et al.

(10) Patent No.: US 10,929,147 B1
(45) Date of Patent: Feb. 23, 2021

(54) MANAGEMENT OF A STATELESS DEVICE ENVIRONMENT

(71) Applicant: Facebook, Inc., Menlo Park, CA (US)

(72) Inventors: Oliver Pell, London (GB); Davide Guerri, London (GB); Dmitry Vnukov, London (GB)

(73) Assignee: Facebook, Inc., Menlo Park, CA (US)

( * ) Notice: Subject to any disclaimer, the term of this patent is extended or adjusted under 35 U.S.C. 154(b) by 206 days.

(21) Appl. No.: 15/890,339

(22) Filed: Feb. 6, 2018

(51) Int. Cl.
  *G06F 9/4401* (2018.01)
  *H04L 9/14* (2006.01)
  *H04L 29/06* (2006.01)
  *H04L 9/08* (2006.01)
  *H04L 9/32* (2006.01)

(52) U.S. Cl.
  CPC .......... *G06F 9/4406* (2013.01); *G06F 9/4416* (2013.01); *H04L 9/0866* (2013.01); *H04L 9/14* (2013.01); *H04L 9/32* (2013.01); *H04L 63/0876* (2013.01)

(58) Field of Classification Search
  CPC ... G06F 9/4406; G06F 9/4416; H04L 9/0866; H04L 9/14; H04L 9/32; H04L 63/0876
  See application file for complete search history.

(56) References Cited

U.S. PATENT DOCUMENTS

| | | | | |
|---|---|---|---|---|
| 6,052,779 A | * | 4/2000 | Jackson | G06F 9/4416 713/2 |
| 2009/0276620 A1 | * | 11/2009 | McCarron | H04L 9/3271 713/155 |
| 2012/0011354 A1 | * | 1/2012 | Owen | G06F 9/4408 713/2 |
| 2013/0067209 A1 | * | 3/2013 | Hall | G06F 9/441 713/2 |
| 2014/0053149 A1 | * | 2/2014 | Wu | G06F 8/63 717/176 |

* cited by examiner

*Primary Examiner* — Jaweed A Abbaszadeh
*Assistant Examiner* — Gayathri Sampath
(74) *Attorney, Agent, or Firm* — Fenwick & West LLP

(57) ABSTRACT

A computing environment includes multiple client devices that may each be configured to serve a particular function within the computing environment. The client devices are each coupled to a client management server that communicates with and manages functions of the client devices. When a client device first boots, the client management server communicates with the client device over a network in order to provision the client device with an enrollment image. Using the enrollment image, a client device can become enrolled with the client management server. Once enrolled, the client management server can provision the client device with a functional operating system image. The functional operating system image can support device applications that require a restricted number of runtime states within the client device. A new functional operating system image is downloaded from the client management server and installed on the client device each time the device is rebooted.

17 Claims, 4 Drawing Sheets

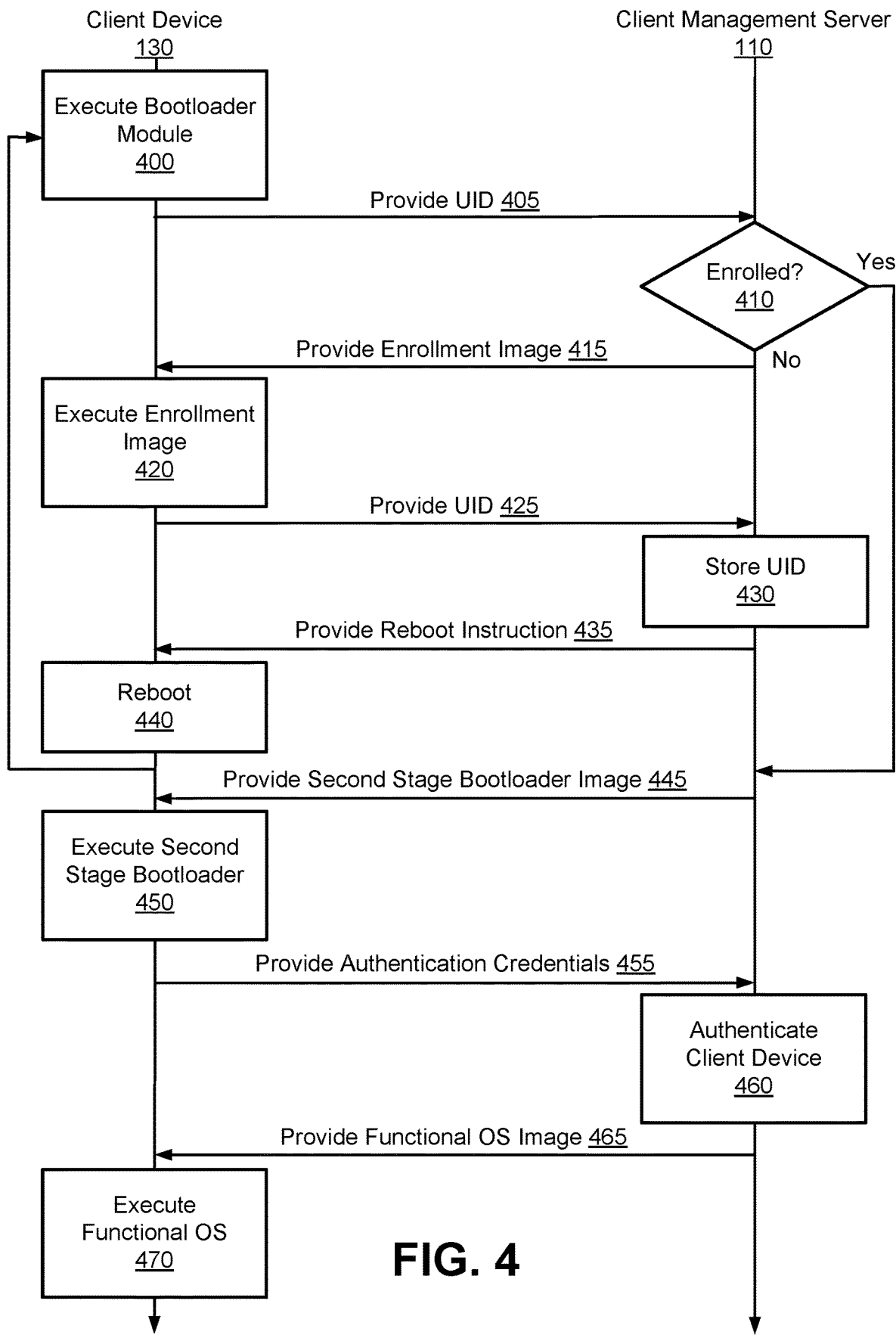

US 10,929,147 B1

MANAGEMENT OF A STATELESS DEVICE ENVIRONMENT

BACKGROUND

This disclosure relates generally to a device management system, and specifically to a stateless device model for updating software executed on one or more deployed devices.

As computer devices become less expensive, enterprises are deploying increased numbers of devices throughout enterprise facilities. For example, enterprises may use electronic displays in place of physical signage, and may provide various portal devices at locations throughout the facilities to enable individuals to access information or perform other tasks. In some instances, a general purpose device may be configurable to serve multiple different functions such as, for example, a wayfinder, a sign-in kiosk, or remote control device. Management of clients in a business environment is important to ensure that each client is functioning as intended. Conventionally, clients can receive software updates that provide the clients with improved functionality for a given configuration, or different configurations to serve a new functionality. However, managing client updates can be challenging in that some clients may experience partial updates while installing an operating system image, resulting in a lack of cohesive states across devices in a business environment. Therefore, a more advanced device management environment is desired that minimizes state within deployed devices.

SUMMARY

A computing environment connects a client management server to client devices deployed throughout a business establishment. Each client device maintains a minimal amount of state space needed to download an operating system image from the client management server, which may include a bootloader and authentication software. The bootloader is used by the client device to load a portion of an operating system image used for providing access to the client management server. The authentication software uses a private key generated during an enrollment process in which a client device may receive authentication from the client management server. Once authentication is received, the client device can download the remainder of the operating system image to be stored in volatile memory. The client device can then execute the operating system image entirely from volatile memory, further reducing the amount of state space required within the client device. Upon reboot, each client device obtains an entirely new operating system image from the client management server, ensuring cohesive states across client devices throughout a business establishment.

BRIEF DESCRIPTION OF THE DRAWINGS

FIG. 4 is an interaction diagram illustrating a process for installing an operating system image on a client device, according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A computing environment includes multiple client devices that may each be configured to serve a particular function within the computing environment. The client devices are each coupled to a client management server that communicates with and manages functions of the client devices. When first starting up or restarting a client device, the client management server communicates with the client device over a network in order to provision the client device with an operating system image. The provisioned operating system image can support applications that have a restricted number of runtime states within the client device. Transitions between states are controlled by the client management server. Once provisioned, the client devices may perform one of several predetermined functionalities. For example, functionalities assigned to the client devices might include wayfinding, room management, dashboard, sign-in kiosk, digital sign, and point of sale terminal functionalities. Each respective functionality is associated with a functional operating system image that is downloaded from the client management server and installed on a client device each time the device is rebooted and which may execute entirely in volatile memory of the client device.

System Architecture

Figure 1:
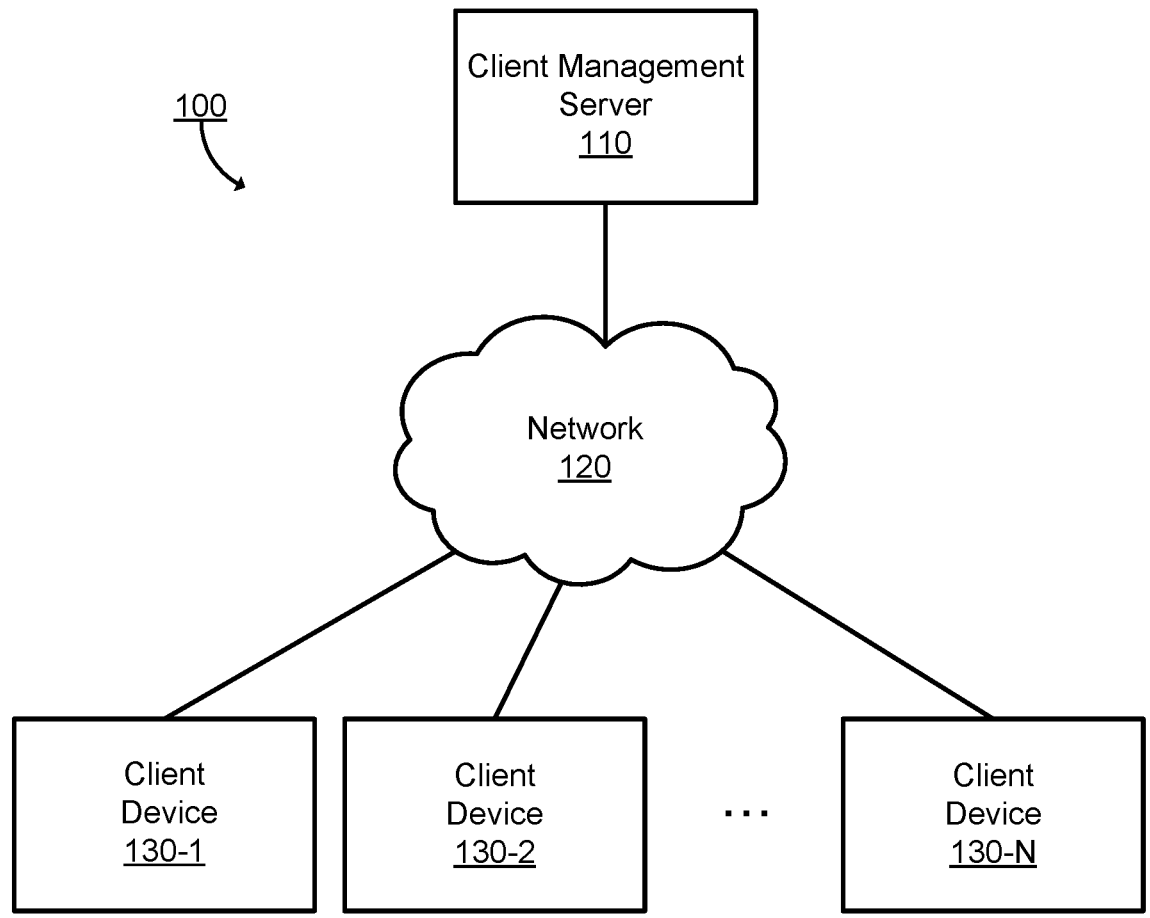
FIG. 1 is a block diagram of a system environment for a computing environment, according to one embodiment.

FIG. 1 is a block diagram of a computing environment 100, according to one embodiment. In the embodiment illustrated in FIG. 1, the computing environment 100 includes a client management server 110, a network 120, and client devices 130-1 through 130-N (collectively referred to herein as client devices 130). In alternative configurations, different and/or additional components may be included in the computing environment 100.

The client devices 130 are network-enabled computing devices capable of communicating data over the network 120, receiving user input, and outputting information to users. In one embodiment, the client devices 130 may comprise specialized computing devices having functionality limited to that sufficient to perform the functions described herein. For example, the client devices 130 may be configured to establish a connection with the client management server 110, execute a simple operating system, and execute one or more limited functionality applications without necessarily being able to execute other more general applications. Furthermore, the client device 130 may have hardware sufficient to perform the tasks attributed to it without necessarily including more complex general purpose hardware. The client devices 130 may furthermore lack a hard disk drive and may instead execute the operating system and device applications only from volatile memory. Thus, the client devices 130 may be constructed at relatively low cost and complexity compared to a general purpose computing device since they are customized to perform a limited number of specialized functions.

The client devices 130 may be configured to support a particular functionality from a predefined set of possible functionalities. Here, each functionality corresponds to a particular device application executing on the client device 130 that may control how the client device 130 operates and may dictate the functions or set of functions performed by the client device 130. In one embodiment, possible functionalities that a client device 130 might support include a wayfinder, a room management device, a dashboard device, a sign-in kiosk, a digital sign, and a point of sale terminal. In this embodiment, the wayfinder functionality may include displaying an interactive map on a client device 130, or an external display screen connected to a client device 130, through which users may receive directions to various destinations or points of interest within an enterprise or business establishment (e.g., shopping mall, office building, theme park, and the like). The room management functionality may include provisioning client devices 130 with features associated with managing meeting rooms, such as providing meeting attendees with control over display screens and lighting. The dashboard functionality may include displaying icons for applications available on a client device 130 or widgets displaying information relevant to the client device's 130 environment. The client device 130 may serve the sign-in kiosk functionality by providing guests of an enterprise or business establishment with an interface displaying alphanumeric characters with which a guest or attendee may sign-in, register, or otherwise document an arrival or departure. The digital sign functionality may include provisioning client devices 130 to serve as signs throughout an enterprise or business establishment. The point of sale functionality may allow a client device 130 to serve as a digital register or check out device in a retail environment such as a café or gift shop. A client device 130 may be provisioned when it is first deployed, or it may be re-deployed in a different configuration.

In an embodiment, client devices 130 do not store their state upon losing power or restarting and thus do not necessarily require a hard disk drive. Rather, each time a client device 130 is reset, or power cycled, the client device 130 is booted to an initial startup state without backing up and restoring data contained in its volatile memory. Resultantly, an operating system image supporting a functionality assigned to the client device 130 will be erased upon reboot of the client device 130, and a new operating system image can be received from the client management server 110 over the network 120. This allows the client device 130 to operate in a stateless manner. The client device 130 can use minimal system data to connect to the client management server 110 and receive authentication in order to load a new operating system image and one or more device applications into memory.

The client management server 110 is a computing device that provisions operating system images and device applications to one or more client devices 130 within a computing environment 100. Each client device 130 within the computing environment 100 is associated with a unique identifier (UID). The client management server 110 can use each UID to identify client devices 130 in a computing environment 100. Based on the identity of a client device 130 as described by its UID, the client management server 110 can determine permissions associated with the client device 130, as well as its intended functionality. For example, if a client device 130 is new to a computing environment 100, and is not yet known to the client management server 110, the client management server 110 detects and enrolls the client device 130 with the client management server 110. Here, the client management server 110 obtains the UID from the client device 130 and stores it to a list or other data structure of enrolled client devices 130 maintained by the client management server 110. Once the client device 130 is enrolled with the client management server 110, the client management server 110 may provide the client device 130 with a functional operating system image that allows the client device 130 to serve a particular functionality. If the client device 130 is rebooted, or otherwise loses power, the volatile memory within the client device 130 is erased, and the client management server 110 again provides the functional operating system image to the client device 130 upon reboot. This allows the client device 130 to operate without storing state in a hard disk drive.

The network 120 facilitates communications between the client devices 130 and the client management server 110. The network 120 may comprise any combination of local area and/or wide area networks, using both wired and/or wireless communication systems. In one embodiment, the network 120 uses standard communications technologies and/or protocols. In some embodiments, all or some of the communication links of the network 120 may be encrypted using any suitable encryption technique.

Figure 2:
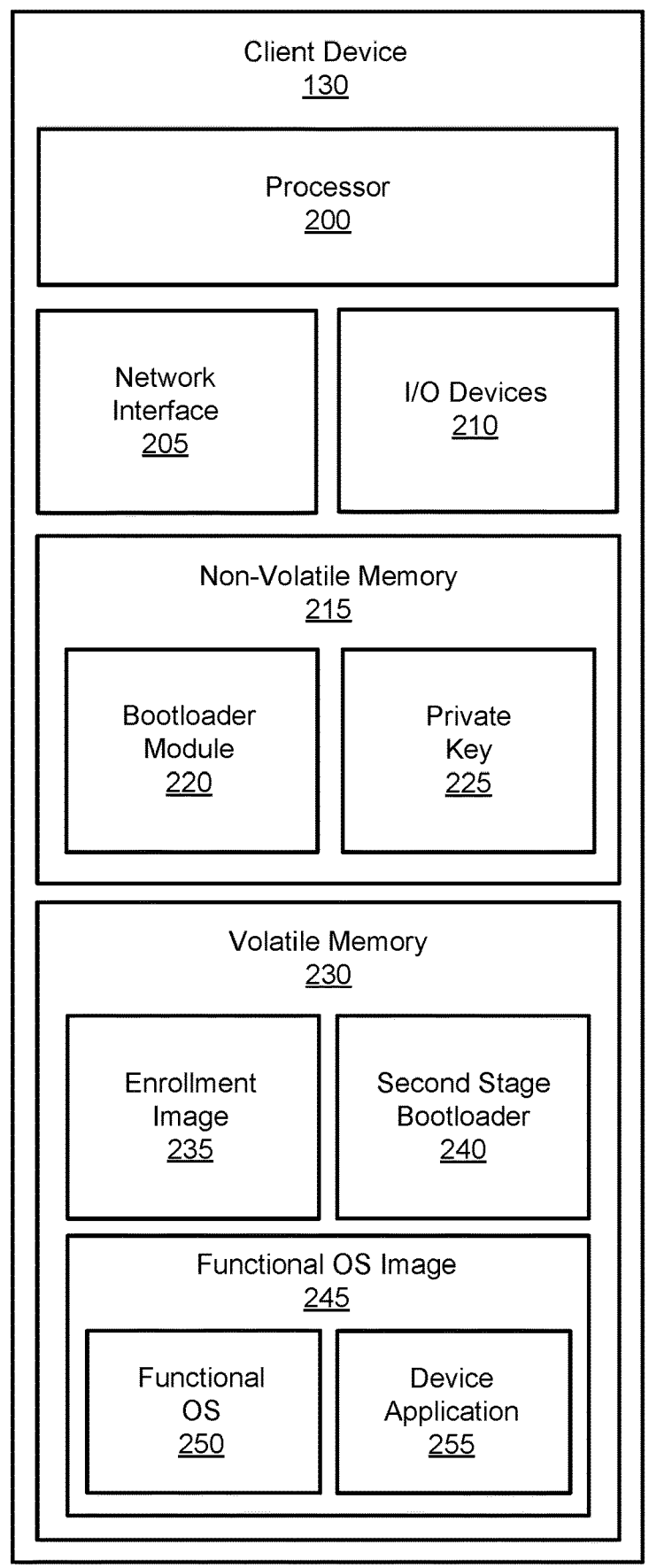
FIG. 2 is a block diagram of a client device, according to one embodiment.

FIG. 2 is a block diagram of a client device 130, according to one embodiment. In the embodiment illustrated in FIG. 2, the client device 130 includes a processor 200, a network interface 205, I/O devices 210, a non-volatile memory 215, and a volatile memory 230. The non-volatile memory 215 includes a bootloader module 220 and a private key 225. The volatile memory 230 includes an enrollment image 235, a second stage bootloader 240, and a functional OS image 245. The functional OS image 245 contains a functional OS 250 and one or more device applications 255. The illustrated components of the volatile memory 230 do not necessarily each operate or exist in the volatile memory 230 concurrently. Rather, at different operational stages, different ones of the enrollment image 235, second stage bootloader 240, and functional OS image 245 may be stored and executed within the volatile memory 230 and other components may be absent. Furthermore, during some operational stages, the enrollment image 235, second stage bootloader 240, and functional OS image 245 may all be absent from the volatile memory.

The network interface 205 comprises hardware, firmware, and/or software to facilitate communication with the client management server 110 via the network 120. The network interface 205 may utilize any conventional wired or wireless communication protocols or a custom communication protocol. The network interface 205 may furthermore enable encrypted or unencrypted communications over the network 120.

The I/O devices 210 include hardware, firmware, and/or associated software to enable users to provide inputs to the client device 130 and to enable the client device 130 to provide various outputs. For example, the I/O devices 210 may include input devices such as a touch sensor or touch panel, a keyboard or keypad, a mouse, a joystick, a gesture recognition system, a microphone, a voice recognition system, physical buttons, dials, or switches, or other input devices. In addition, the I/O devices 210 may include integrated output devices such as a display screen, a speaker, a haptic feedback device, or other output device. The I/O devices 210 may also include communication ports to enable the client device 130 to control external devices such as external displays, speakers, or communication devices. In one embodiment, the client device 130 may include an external display screen that communicates with the client device 130 through the I/O device 210. The I/O devices 210 in the client device 130 may also comprise sensors such as a badge reader (e.g., a magnetic strip reader or a radio-frequency identifier (RFID) sensor, or other wireless proximity sensor).

The non-volatile memory 215 is a long-term persistent storage that stores the bootloader module 220 and the private key 225. Examples of non-volatile memory 215 in the client device 130 can include read-only memory (ROM), flash memory, ferroelectric RAM, or other computer storage devices such as solid state drives.

The bootloader module 220 comprises executable instructions that are executed by the processor 200 upon the client device 130 starting up. The bootloader module 220 may include only minimal instructions and cryptographic material (e.g. minimal set of x509 certificates) to enable the client device 130 to establish a secure connection with the client management server 110 and to provide a UID associated with the client device 130 to the client management server 110. For example, the bootloader module 220 may comprise executable instructions that, when executed by the processor 200, cause the client device 130 to send a query containing a UID identifying the client device 130 to a specified network address (e.g., a uniform resource locator) that is associated with the client management server 110.

The enrollment image 235 is received from the client management server 110 in response to the initial query from the bootloader module 220 in the case that the client device 130 is not already enrolled with the client management server 110. The enrollment image 235 comprises executable instructions that enable the client device 130 to enroll itself with the client management server 110. The enrollment image 235 may exclude sensitive information (e.g., information that may compromise the security of the computing environment 100), and can therefore be safely sent from the client management server 110 to an untrusted device, such as the client device 130 before it is authenticated. Upon receiving the enrollment image 235, the client device 130 stores the enrollment image 235 to the volatile memory 230 and executes the instructions. Upon execution of the instructions, the processor 200 generates a key pair that can be used between the client device 130 and the client management server 110 for asymmetric cryptographic communication. The key pair includes a public key and the private key 225. The public key is transmitted to the client management server 110. In one embodiment, the private key 225 is stored within a Trusted Platform Module (TPM) which may be within the non-volatile memory 215 of the client device 130. Storing the private key 225 in the non-volatile memory 215 ensures that the private key 225 will not be erased if the client device 130 reboots or is power cycled. Use of the private key 225 is subject to the integrity of the platform. The client device 130 can verify its integrity by measuring the content of non-volatile memory 215 before its content is executed, and can then compare the measurements with a set of expected measurements. These expected measurements are provided to a private key 225 creation function and cannot be subsequently modified. Once enrollment is completed, the enrollment image 235 may cause the client device 130 to reboot.

In one embodiment, the second stage bootloader 240 is received from the client management server 110 in response to the initial query from the bootloader module 220 in the case that the client device 130 has previously enrolled with the client management server 110. The second stage bootloader 240 includes executable instructions that enable the client device 130 to establish an authenticated connection with the client management server 110. Upon receiving the second stage bootloader 240, the client device 130 stores the second stage bootloader 240 to the volatile memory 230 and executes the instructions therein. Upon execution, the second stage bootloader 240 provides authentication credentials from the client device 130 to the client management server 110 to enable the client management server 110 to authenticate the client device 130. The authentication credentials may include the UID of the client device 130 together with a proof of identity derived from the private key 225. In one embodiment, the TPM of the client device 130 can use the private key 225 to generate a proof of identity without providing the client management server 110 access to the private key 225. In another embodiment, the UID of the client device 130 can also include the proof of identity as generated by the bootloader module 220 rather than the second stage bootloader 240. Once authenticated, the second stage bootloader 240 may also operate together with the client management server 110 to establish an authenticated (and optionally encrypted) communication session. In another embodiment, a client device 130 may be authenticated by the client management server 110 without necessarily requiring a second stage bootloader 240. In this embodiment, a valid (e.g., previously enrolled) client device 130 may receive a functional OS image 245 directly from the client management server 110 in response to an initial query from the bootloader module 220 in the client device 130. The client management server 110 can identify the client device 130 based on the UID provided by the client device 130 in addition to a proof of identity derived from the private key 225, and can provide the client device 130 with a functional OS image 245 accordingly.

The functional OS image 245 is an operating system image received from the client management server 110 after the second stage bootloader 240 establishes an authenticated connection with the client management server 110. The functional OS image 245 may comprise a functional OS 250 and one or more device applications 255. Furthermore, the functional OS image 245 may specify a particular configuration or state of the functional OS 250 and/or the device application 255. Upon receipt of the functional OS image 245, the client device stores the functional OS image 245 to the volatile memory 230 and executes the functional OS 250, which may in turn cause execution of the device application 255. Execution of the functional OS image 245 causes the client device 130 to carry out the functionality of the client device 130 described above. For example, depending on the particular configuration of the received functional OS image 245, the client device 130 may operate as a wayfinder, a room management device, a dashboard device, a sign-in kiosk, a digital sign, or a point of sale terminal.

Beneficially, because the functional OS image 245 operates in the volatile memory 230, the client device 130 may erase a functional OS image 245 and install a new image simply by rebooting if the functional OS image 245 becomes corrupted, is installed improperly, or is in need of an update. This allows a client device 130 to be provisioned with a functional OS image 245 without creating a need for additional configuration management systems that could introduce inconsistencies across client devices 130. Additionally, a client device 130 may be easily re-provisioned as a new type of device by simply providing a new functional OS image 245 to the client device 130 that is configured to implement a different functionality.

Figure 3:
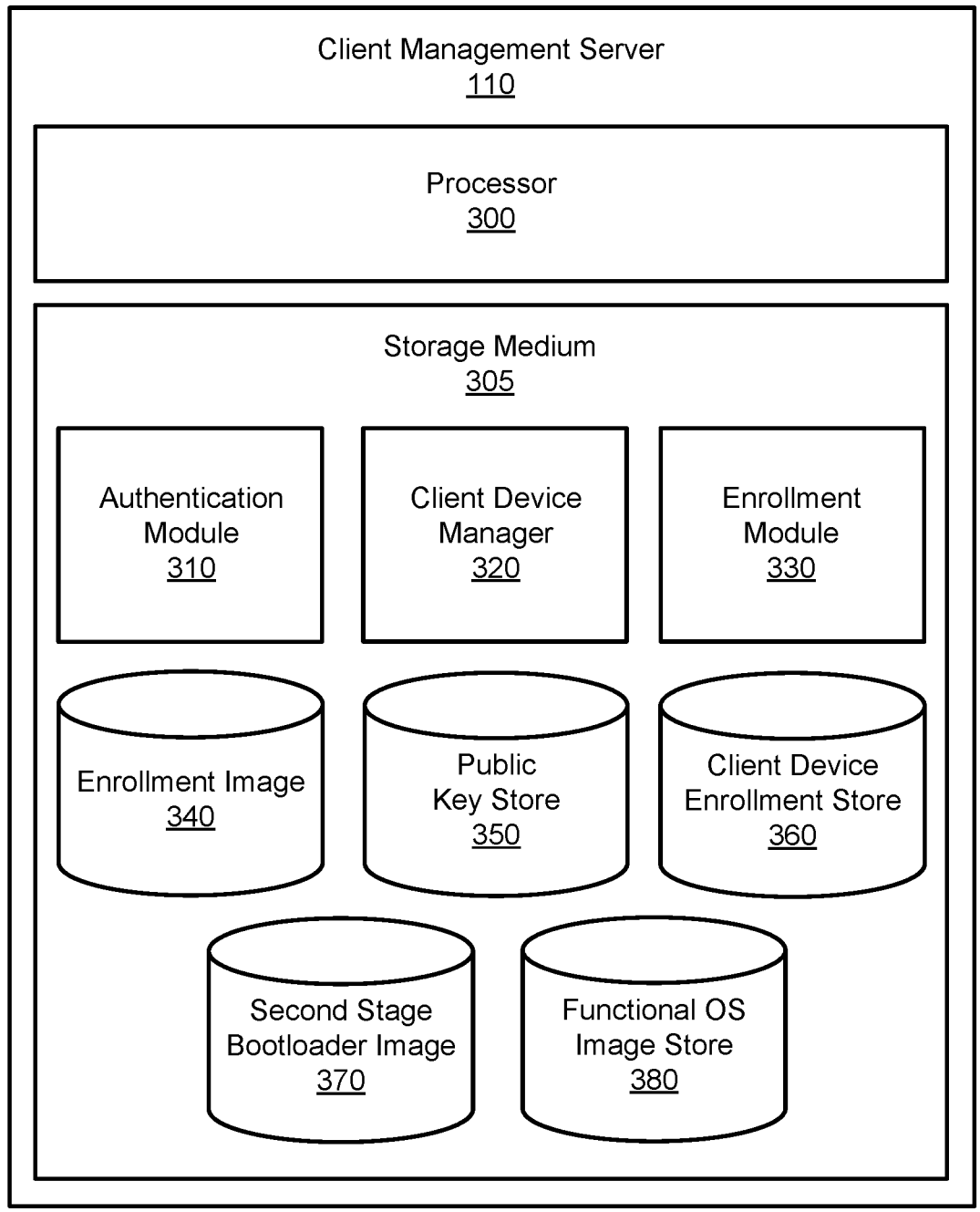
FIG. 3. Is a block diagram of a client management server, according to one embodiment.

FIG. 3 illustrates a client management server 110 for managing the client devices 130, according to one embodiment. In the embodiment illustrated in FIG. 3, the client management server 110 includes a processor 300 and a storage medium 305. The storage medium 305 includes an authentication module 310, a client device manager 320, an enrollment module 330, an enrollment image 340, a public key store 350, a client device enrollment store 360, a second stage bootloader image 370, and a functional OS image store 380. The client management server 110 can communicate with client devices 130 via the network 120.

The enrollment module 330, when executed by the processor 300, can enroll a client device 130 with the client management server 110. The enrollment module 330 receives an initial query with a UID from a bootloader module 220 of a client device 130 and determines, based on the UID, if the client device 130 has been previously enrolled. For example, the enrollment module 330 compares the received UID to UIDs stored in the client device enrollment store 360. If the UID is not listed in the client device enrollment store 360, the enrollment module 330 determines that the client device 130 has not been enrolled with the client management server 110, and provides the untrusted client device 130 with the enrollment image 340. In one embodiment, the enrollment module 330 can generate an entry for the UID in the client device enrollment store 360 in response to receiving verification from a trusted user of the client device 130 (e.g., an administrator) indicating that the client device 130 can be trusted. In another embodiment, the enrollment module 330 simply generates an entry for the UID in the client device enrollment store 360 without necessarily requiring human verification. The enrollment module 330 receives the public key generated by the client device 130 during enrollment and stores it to the public key store 350. A reference may also be stored in the client device enrollment store 360 associating the UID with a pointer to the public key in the public key store 350. Otherwise, if the enrollment module 330 identifies the received UID in the client device enrollment store 360, it determines that the client device 130 is already enrolled. In this case, the enrollment module 330 provides the second stage bootloader image 370 to the client device 130.

The authentication module 310 performs authentication of a client device 130 to enable the client device 130 to establish an authenticated connection to the client management server 110. For example, the client management server 110 receives credentials (e.g., a UID and a proof of identity derived from the private key of the client device 130) from the second stage bootloader 240 of the client device 130. The authentication module 310 identifies a public key in the public key store 350 associated with the received UID and cryptographically validates the proof of identity using the public key. If the authentication module 310 cannot authenticate the client device 130, it may terminate the connection. Otherwise, the authentication module 310 enables the client device 130 to establish an authenticated (and optionally encrypted) connection with the client management server 110.

Upon establishing an authenticated connection, the client device manager 320 can provision a client device 130 with a functional OS image 245 from the functional OS image store 380 that provides the client device 130 with a particular functionality. The functional OS image store 380 may store a limited number of different functional OS images each associated with a different functionality for a client device 130. Each type of functional OS image may have a different functional OS image identifier. In an embodiment, the client device manager 320 may select the appropriate functional OS image to send to a client device 130 based on association stored in the client device enrollment store 360 between a UID of the client and a functional OS image identifier. The association between UIDs and different the functional OS image identifiers for the different types of functional images available in the functional OS image store 380 may be assigned by an administrator.

Because each client device 130 is stateless, the client device manager 320 can monitor the limited number of states supported by each device, and can provide transitions between states when necessary. Client device 130 state consists of independent stages, or steps, that may be represented with an integer, Boolean value (e.g., true or false), and/or enumerated value. Each state value within a client device 130 can be described by the client device 130 to the client device manager 320. For example, each state of the client device 130 can have a respective plugin executing on the client device 130 designated to compute a value describing the state to the client device manager 320. If the client device manager 320 identifies an anomaly in an expected state value (e.g., a null value), the client device manager 320 may determine that the client device 130 requires reboot in order to remedy this inconsistent state. Typical state values reported to the client device manager 320 from the client device 130 include version number or hash/checksum of the application executing on the client device, for example. In this way, the client device manager 320 can monitor the current states of each client device 130 in a computing environment 100 and can provide transitions between states as needed, in addition to identifying client devices 130 reporting inconsistent states.

The client device manager 320 can instruct a client device 130 to reboot if the client device 130 is in a state that is inconsistent with that expected by the client device manager 320 for a given functionality. The client device manager 320 can monitor the current state exhibited by each client device 130 in a computing environment 100 and can cross-reference the state of each client device 130 with a correct state corresponding to each respective functionality. If the client device manager 320 identifies a given state value that does not match a state value expected by the client device manager 320, the client device manager 320 can send the client device 130 instructions to reboot. Once rebooted, the authentication module 310 can re-authenticate the client device 130 and the client device manager 320 can re-provision the client device 130 with a functional OS image. For example, if a client device 130 is configured to function as a wayfinder while executing version X of a functional OS image 245, the client device manager 320 can receive periodic reports from the client device 130 indicating this state. However, if the client device manager 320 identifies that other client devices 130 serving as wayfinders within the computing environment 100 are executing version Y of a functional OS image 245, the client device manager 320 can determine that the client device 130 is in an inconsistent state with the surrounding client devices 130 and can instruct the client device 130 to reboot in order to install version Y of the functional OS image 245.

FIG. 4 is an interaction diagram illustrating a process for provisioning a client device 130 with a functional OS image 245, according to one embodiment. In the embodiment illustrated in FIG. 4, the client device 130 executes 400 a bootloader module 220 that provides 405 a unique identifier (UID) describing the client device 130 to the client management server 110. The client management server 110 determines 410 if the client device 130 has been enrolled with the client management server 110. If the client device 130 has not been enrolled, the client management server 110 provides 415 the client device 130 with an enrollment image 340. The client device 130 executes 420 the enrollment image (e.g., generates a key pair) and again provides 425 the client management server 110 with its UID. The client management server 110 stores 430 the UID and provides 435 the client device an instruction to reboot. The client device subsequently reboots 440. Upon reboot, the client device 130 again executes 400 the bootloader module that provides 405 the UID to the client management server 110. The client management server 110 again receives the UID, and identifies that the client device 130 has been enrolled. The client management server 110 provides 445 the client device 130 with a second stage bootloader image 370. The client device 130 executes 450 the second stage bootloader image 370 that then provides 455 authentication credentials to the client management server 110. The client management server 110 authenticates 460 the client device 130 using the authentication credentials and provides 465 the client device 130 with a functional OS image 245 according to the assigned functionality of the client device 130. Lastly, the client device 130 executes 470 the functional OS 250 to enable the client device 130 to carry out its intended functionality.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

The invention claimed is:

1. A computer-implemented method comprising:
   starting up a client device in an initial startup state, the client device having a non-volatile memory and a volatile memory, wherein a bootloader is stored in the non-volatile memory of the client device, and wherein the startup state does not have a functional operating system image stored in the non-volatile memory;
   loading, by a processor, the bootloader stored in the non-volatile memory of the client device;
   causing, by the bootloader, the client device to send an identifier for the client device to a predefined network address associated with a client management server;
   obtaining, from the client management server, the functional operating system image in response to the client management server determining based on the identifier that the client device is valid;
   storing the received functional operating system image in the volatile memory of the client device;
   executing the functional operating system image from the volatile memory;
   sending, to the client management server, a current state of a device application executing on the client device and a configuration of the device application; and
   responsive to the current state of the device application not matching an expected state associated with the configuration of the device application, the expected state describing a correct state for the configuration of the device application:
   receiving, from the client management server, while executing the functional operating system image, instructions to reboot the client device; and
   responsive to receiving the instructions to reboot, rebooting the client device to the initial startup state without backing up a state of the functional operating system to the non-volatile memory.

2. The computer-implemented method of claim 1, wherein obtaining the functional operating system comprises:
   receiving, from the client management server, a second stage bootloader in response to the client management server determining based on the identifier that the client device is enrolled;
   executing the second stage bootloader to provide authentication credentials from the client device to the client management server, the authentication credentials comprising a cryptographic proof of identity corresponding to the identifier for the client device;
   receiving, from the client management server in response to the client management server authenticating the client device based on the authentication credentials, the functional operating system image.

3. The computer-implemented method of claim 2, wherein executing the second stage bootloader comprises:

retrieving a private key from the non-volatile memory of the client device, the private key generated responsive to executing the enrollment operating system image; and providing authentication credentials to the client management server, the authentication credentials including a proof of identity derived from the private key.

4. The computer-implemented method of claim 1, further comprising:
prior to obtaining the functional operating system image:
receiving an enrollment operating system image from the client management server;
generating, by execution of the enrollment operating system image, a key pair comprising a public key and a private key;
transmitting the public key to the client management server;
storing the private key to the non-volatile memory of the client device; and
rebooting the client device.

5. The computer-implemented method of claim 1, wherein obtaining the functional operating system image comprises:
receiving a functional operating system with a preloaded device application and configuration state to carry out a predefined functionality;
storing the functional operating system with the preloaded device application and configuration state in the volatile memory of the client device; and
executing the functional operating system and the preloaded device application from the volatile memory.

6. The computer-implemented method of claim 1, wherein the bootloader is loaded from a non-volatile storage of the client device responsive to startup of the client device.

7. A non-transitory computer readable storage medium having instructions encoded thereon that, when executed by a processor, cause the processor to perform the steps including:
starting up a client device in an initial startup state, the client device having a non-volatile memory and a volatile memory, wherein a bootloader is stored in the non-volatile memory of the client device, and wherein the startup state does not have a functional operating system image stored in the non-volatile memory;
loading, by a processor, the bootloader stored in the non-volatile memory of the client device;
causing, by the bootloader, the client device to send an identifier for the client device to a predefined network address associated with a client management server;
obtaining, from the client management server, the functional operating system image in response to the client management server determining based on the identifier that the client device is valid;
storing the received functional operating system image in the volatile memory of the client device;
executing the functional operating system image from the volatile memory;
sending, to the client management server, a current state of a device application executing on the client device and a configuration of the device application; and
responsive to the current state of the device application not matching an expected state associated with the configuration of the device application, the expected state describing a correct state for the configuration of the device application:

receiving, from the client management server, while executing the functional operating system image, instructions to reboot the client device; and
responsive to receiving the instructions to reboot, rebooting the client device to the initial startup state without backing up a state of the functional operating system to the non-volatile memory.

8. The non-transitory computer readable storage medium of claim 7, wherein obtaining the functional operating system comprises:
receiving, from the client management server, a second stage bootloader in response to the client management server determining based on the identifier that the client device is enrolled;
executing the second stage bootloader to provide authentication credentials from the client device to the client management server, the authentication credentials comprising a cryptographic proof of identity corresponding to the identifier for the client device;
receiving, from the client management server in response to the client management server authenticating the client device based on the authentication credentials, the functional operating system image.

9. The non-transitory computer readable storage medium of claim 8, wherein executing the second stage bootloader comprises:
retrieving a private key from the non-volatile memory of the client device, the private key generated responsive to executing the enrollment operating system image; and
providing authentication credentials to the client management server, the authentication credentials including a proof of identity derived from the private key.

10. The non-transitory computer readable storage medium of claim 7, further comprising:
prior to obtaining the functional operating system image:
receiving an enrollment operating system image from the client management server;
generating, by execution of the enrollment operating system image, a key pair comprising a public key and a private key;
transmitting the public key to the client management server;
storing the private key to the non-volatile memory of the client device; and
rebooting the client device.

11. The non-transitory computer readable storage medium of claim 7, wherein obtaining the functional operating system image comprises:
receiving a functional operating system with a preloaded device application and configuration state to carry out a predefined functionality;
storing the functional operating system with the preloaded device application and configuration state in the volatile memory of the client device; and
executing the functional operating system and the preloaded device application from the volatile memory.

12. The non-transitory computer readable storage medium of claim 7, wherein the bootloader is loaded from a non-volatile storage of the client device responsive to startup of the client device.

13. A system comprising:
a computer processor; and
a computer-readable storage medium coupled to the computer processor, the computer-readable storage medium storing executable code, the code when executed by the computer processor performs steps comprising:

starting up a client device in an initial startup state, the client device having a non-volatile memory and a volatile memory, wherein a bootloader is stored in the non-volatile memory of the client device, and wherein the startup state does not have a functional operating system image stored in the non-volatile memory;

loading, by a processor, the bootloader stored in the non-volatile memory of the client device;

causing, by the bootloader, the client device to send an identifier for the client device to a predefined network address associated with a client management server;

obtaining, from the client management server, the functional operating system image in response to the client management server determining based on the identifier that the client device is valid;

storing the received functional operating system image in the volatile memory of the client device;

executing the functional operating system image from the volatile memory;

sending, to the client management server, a current state of a device application executing on the client device and a configuration of the device application; and responsive to the current state of the device application not matching an expected state associated with the configuration of the device application, the expected state describing a correct state for the configuration of the device application:

receiving, from the client management server, while executing the functional operating system image, instructions to reboot the client device; and responsive to receiving the instructions to reboot, rebooting the client device to the initial startup state without backing up a state of the functional operating system to the non-volatile memory.

14. The system of claim 13, wherein obtaining the functional operating system comprises:

receiving, from the client management server, a second stage bootloader in response to the client management server determining based on the identifier that the client device is enrolled;

executing the second stage bootloader to provide authentication credentials from the client device to the client management server, the authentication credentials comprising a cryptographic proof of identity corresponding to the identifier for the client device;

receiving, from the client management server in response to the client management server authenticating the client device based on the authentication credentials, the functional operating system image.

15. The system of claim 14, wherein executing the second stage bootloader comprises:

retrieving a private key from the non-volatile memory of the client device, the private key generated responsive to executing the enrollment operating system image; and providing authentication credentials to the client management server, the authentication credentials including a proof of identity derived from the private key.

16. The system of claim 13, further comprising:

prior to obtaining the functional operating system image:

receiving an enrollment operating system image from the client management server;

generating, by execution of the enrollment operating system image, a key pair comprising a public key and a private key;

transmitting the public key to the client management server;

storing the private key to the non-volatile memory of the client device; and rebooting the client device.

17. The system of claim 13, wherein obtaining the functional operating system image comprises:

receiving a functional operating system with a preloaded device application and configuration state to carry out a predefined functionality;

storing the functional operating system with the preloaded device application and configuration state in the volatile memory of the client device; and executing the functional operating system and the preloaded device application from the volatile memory.

* * * * *